United States Patent [19]

Takenaka

[11] 4,217,025
[45] Aug. 12, 1980

[54] STEREOSCOPIC MICROSCOPE

[75] Inventor: Hiroshi Takenaka, Kawasaki, Japan

[73] Assignee: Nippon Kogaku K.K., Tokyo, Japan

[21] Appl. No.: 920,794

[22] Filed: Jun. 30, 1978

[30] Foreign Application Priority Data

Jul. 25, 1977 [JP] Japan .................................. 52-88342

[51] Int. Cl.² ............................................. G02B 21/02
[52] U.S. Cl. ....................................... 350/33; 350/36; 350/145
[58] Field of Search ....................... 350/31, 33, 36, 145

[56] References Cited

U.S. PATENT DOCUMENTS

| 3,912,359 | 10/1975 | Uetake et al. | 350/36 |
| 3,994,558 | 11/1976 | Schulz et al. | 350/36 |

Primary Examiner—John K. Corbin
Assistant Examiner—Matthew W. Koren
Attorney, Agent, or Firm—Fitzpatrick, Cella, Harper & Scinto

[57] ABSTRACT

A microscope for stereoscopically observing therethrough an object from an oblique direction comprises a first convergent lens group and two second convergent lens groups. The first convergent lens group is disposed with the optic axis thereof perpendicular to the object plane to collimate the light from each point on the object plane when the focal plane thereof is coincident with the object plane. The two second convergent lens groups have equivalent optical performances and are parallel-disposed so that the principal planes thereof are coincident with each other on the exit side of the first convergent lens group and that the principal planes thereof are disposed non-parallel by forming a predetermined angle with the principal plane of the first lens group.

4 Claims, 8 Drawing Figures

FIG. 4A  FIG. 4B
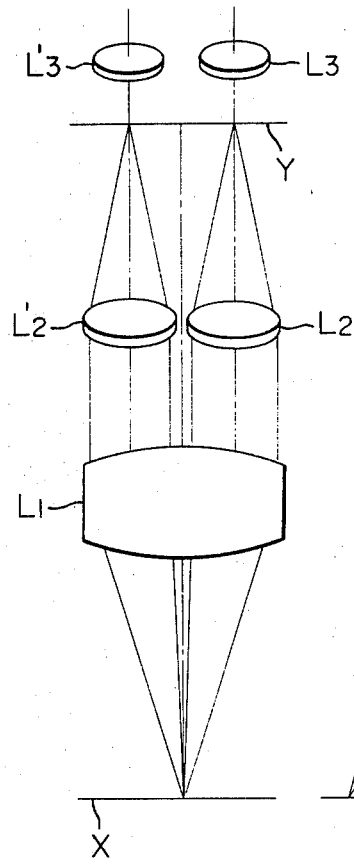
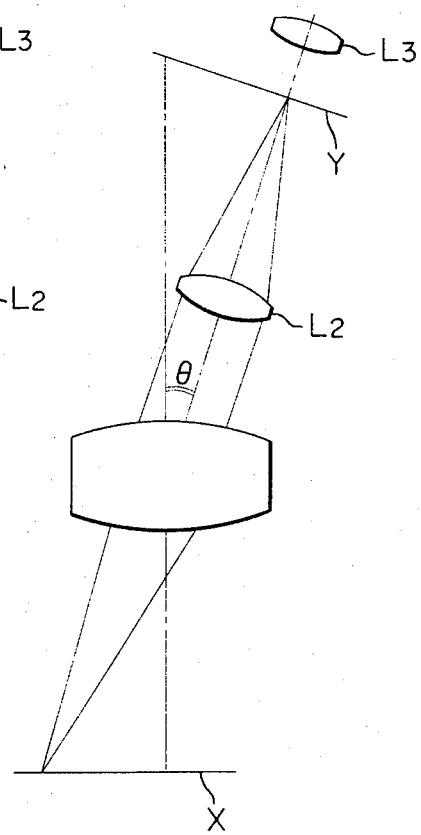
FIG. 5
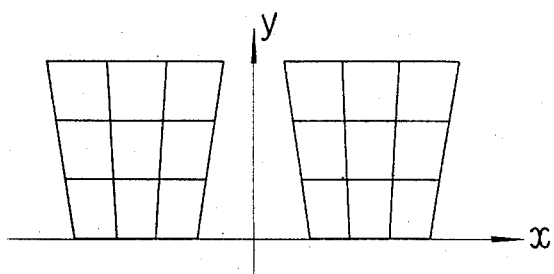

STEREOSCOPIC MICROSCOPE

BACKGROUND OF THE INVENTION

1. Field of the Invention

This invention relates to a stereoscopic microscope for observing therethrough an object from an oblique direction.

2. Description of the Prior Art

When an object is observed at a comparatively low magnification for a long time, use is usually made of a stereoscopic microscope to reduce the viewer's fatigue and to grasp the stereoscopic construction of the object. The observation is usually effected from the direction perpendicular to the plane of the object, but in some cases it is required that the observation be effected from a direction oblique with respect to the plane of the object for some reason or purpose. For example, such cases include the case of a microscope used to examine wafers during the manufacturing process of Integrated Circuits (hereinafter abbreviated as IC). In this case, various patterns are successively printed on IC wafers and such printing is effected vertically from above the wafer and so, the wafers must be observed from an oblique upward direction so as not to interfere with the printing.

As a microscope for effecting such stereoscopic observation from the oblique upward direction, there is known an application of the so-called inwardly oblique stereoscopic microscope as shown in the perspective view of FIG. 1 of the accompanying drawings, but satisfactory observation has been impossible because of distortion of the image, as will hereinafter be described. In such case, the observation optic axis of the eyes (the direction in which the object plane is observed, and in the present case they are coincident with the optic axes of objective lenses L10 and L'10, respectively) is converged at an angle of $2\alpha$, and for the observation from the oblique direction, the plane S containing the optic axes is inclined by an angle $\beta$ with respect to the normal n to the object plane.

These angles of inclination $\alpha$ and $\beta$ are within planes orthogonal to each other, so that distortion resulting from the difference in magnification takes place in the two directions orthogonal to each other, and when an object like graph paper as shown in FIG. 2(a) is to be observed, the right and left observation images become configured as roughly shown in FIG. 2(b). The distortion in the y-direction of the two right and left images is the distortion in the same direction resulting from the inclination $\beta$ of the observation optic axis, while the distortion in the x-direction is oppositely directed distortion resulting from the angle of conversion $2\alpha$ and thus, no parallel straight line exists in the two images. Therefore, if the right and left images are superposed upon each other with a certain straight line in the x-direction as the reference, the straight line of the right and left images in the y-direction intersect each other and if certain straight lines in the y-direction are made coincident with one another, the straight lines in the x-direction intersect each other, thus making it impossible to make coincident any two straight lines in the right and left images. Therefore, if stereoscopic observation is effected, the fields of view in the two eyes are not coincident at all and this has caused great fatigue of the viewer's eyes and consequent headache, thus bringing about great inconvenience in long-time observation.

On the other hand, relatively high magnifications are also required in a stereoscopic microscope for observing an object from an oblique direction and in such case, the field of view necessarily becomes narrow, thus making it impossible to observe a wide range. Moving the object would occur to mind to enable a wide range to be observed and for example, in the observation of IC wafers described above, moving the wafer itself during the printing is nearly impossible because the printing of various patterns on the wafer is effected while very precise positioning is taking place. It is therefore necessary to contrive continuously to vary the field of view in the microscope.

For this purpose, it would occur to mind to vary the inclination of the observation optic axes about the objective lens, but the conventional device as shown in FIG. 1 is not sufficient for such variation. FIG. 3 shows, in side view, the manner in which image formation takes place when the angle of inclination of the observation optic axes in the conventional device is $\beta_1$. The dash lines in FIG. 3 refer to the case of the angle of inclination $\beta_2$. Since the right and left observation optical systems are equivalent to each other, description of only one of them is sufficient for the following explanation. When the angle of inclination of the observation optic axis changes from $\beta_1$ to $\beta_2$, the center of the view field should change from the object point $P_1$ to $P_2$, as shown. However, the distance to the object point $P_1$ and the distance to the object point $P_2$ change with respect to the objective lens L10, so that the distance to the image point P'1 and the distance to the image point P'2 change, and also the inclination of the image plane Y is varied. Due to the Scheimpflug condition, known as the so-called swings and tilts, the image plane Y is formed so as to intersect the line of intersection (shown as point of intersection Q) between the object plane X and the principal plane H of the objective lens and therefore, the inclination of the image plane Y is varied more than the inclination of the observation optic axis. When the field view is moved by so varying the inclination of the observation optic axis, the image changes both its inclination and position with respect to the eyepiece as long as the objective lens and the eyepiece are integral, so that observation is only permitted within a very narrow range in the depth of focus of the objective lens L10 or the eyepiece L20, and sometimes no observation can be effected. By varying the inclination of the objective lens and moving the eyepiece so as to trace the resultant displacement of the image, it is not impossible to obtain a clear image but the movement of the objective lens and that of the eyepiece are entirely different from each other and this would necessitate a greatly complicated mechanism which would not be practical.

SUMMARY OF THE INVENTION

I have conceived and contribute by the present invention a stereoscopic microscope for observing therethrough an object plane from an oblique direction in which the distortions of the right and left images are improved to alleviate the above-described difficulties and disadvantages with which stereoscopic observation is effected.

According to one aspect of the present invention I provide a microscope in which the field of view can be continuously varied by simple movement of part of the device thereby enabling observation of a wider range than heretofore.

According to a further aspect of the present invention, the stereoscopic microscope for stereoscopically observing therethrough an object from an oblique direction comprises a first convergent lens group disposed with the optic axis thereof perpendicular to the object plane to collimate the light from each point on the object plane when the focal plane thereof is made coincident with the object plane, and two second convergent lens groups having equivalent optical performances and parallel-disposed so that the principal planes thereof are coincident with each other on the exit side of the first convergent lens group and that the principal planes thereof are disposed non-parallel by forming a predetermined angle with the principal plane of the first lens group.

The device of the present invention may further comprise two eyepieces disposed so that the optic axes thereof are coincident with the optic axes of the two second convergent lens groups on the exit side thereof and that the entrance side focal points thereof are coincident with the focal points on the exit side of the two second convergent lens groups.

There has thus been outlined rather broadly the more important features of the invention in order that the detailed description thereof that follows may be better understood and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE DRAWINGS

Specific embodiments of the invention have been chosen for purposes of illustration and description, and are shown in the accompanying drawings forming a part of the specification wherein:

FIG. 4(a) is a front view of the device according to the present invention;

FIG. 4(b) is a side view thereof;

FIG. 5 shows the right and left observation image according to the device of the present invention.

DESCRIPTION OF THE PREFERRED EMBODIMENTS

In the stereoscopic microscope according to the present invention, the objective lens comprises two types of convergent groups, i.e. a first group and second groups. A front view of the schematic construction of the present invention is shown in FIG. 4(a), and a side view thereof is shown in FIG. 4(b). The first convergent lens group L1 has a comparatively large diameter and is used commonly for two right and left observation optical systems, and second convergent lens groups L2, L'2 are provided as the right and left observation optical systems. The two second groups are parallel-disposed so that the principal planes thereof are coincident with each other behind the first group. The first group L1 is disposed so that the optic axis thereof is perpendicular to the object plane X and that the focal plane thereof is coincident with the object plane X. The parallel-disposed two second groups L2, L'2 are provided with their optic axes inclined by an angle $\theta$ with respect to the optic axis of the first group L1. Two eyepieces L3 and L'3 are disposed with their optic axes coincident with those of the second groups L2, L'2.

Figure 1:
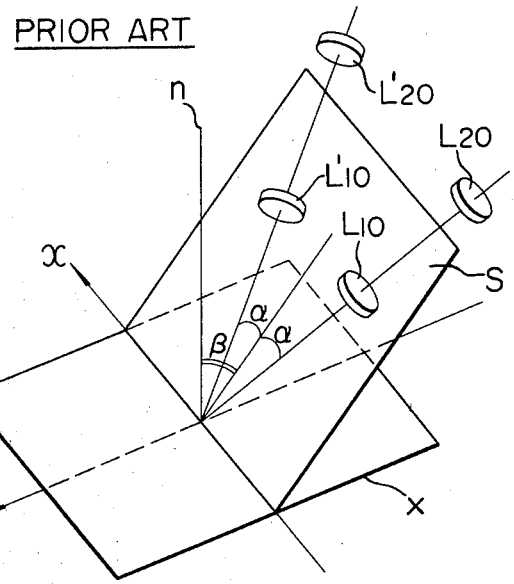
FIG. 1 is a perspective view of a device according to the prior art.
Figure 2A:
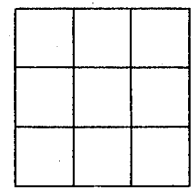
FIG. 2(a) shows an object like graph paper.
Figure 2B:
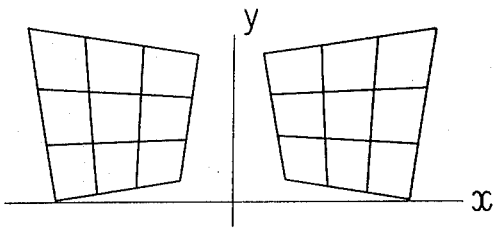
FIG. 2(b) shows the right and left observation images of the object of FIG. 2 viewed with the prior art device.

According to the above-described construction of the objective lens, the light flux passing from the object point on the object plane X and through the first group L1 is all parallel and the light fluxes entering the second groups L2, L'2 are focused on the focal plane Y behind the second groups L2 and L'2. Thus, space images are formed on the focal plane behind the second group L2, L'2, respectively, and may be stereoscopically observed through the eyepieces L3 and L'3. The images appearing when the object like graph paper as shown in FIG. 2(a) is observed through the microscope creates distortions as seen in FIG. 5, but the distortions are only in the y-direction and the distortions of the right and left images are equal. This distortion in the y-direction is unavoidable because the observation optic axes are inclined by the angle $\theta$.

However, no distortion occurs in the x-direction and all the straight lines in this direction maintain parallelism, and the shapes of the distortions in the y-direction are substantially equal, thus enabling the two images to be substantially completely coincident. This can eliminate the discomfort which has heretofore been experienced due to the non-coincidence between the right and left images, and thereby enable good stereoscopic observation. In the prior art device, the observation optic axes have been coincident with the optic axis of the objective lens, but in the device of the present invention, the observation optic axes are coincident with the optic axes of the second groups of the objective lens.

Figure 6:
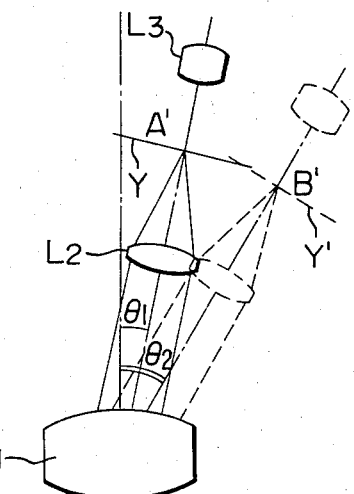
FIG. 6 is a side view illustrating the angle of inclination of the observation optic axis of the device according to the present invention.
Figure 3:
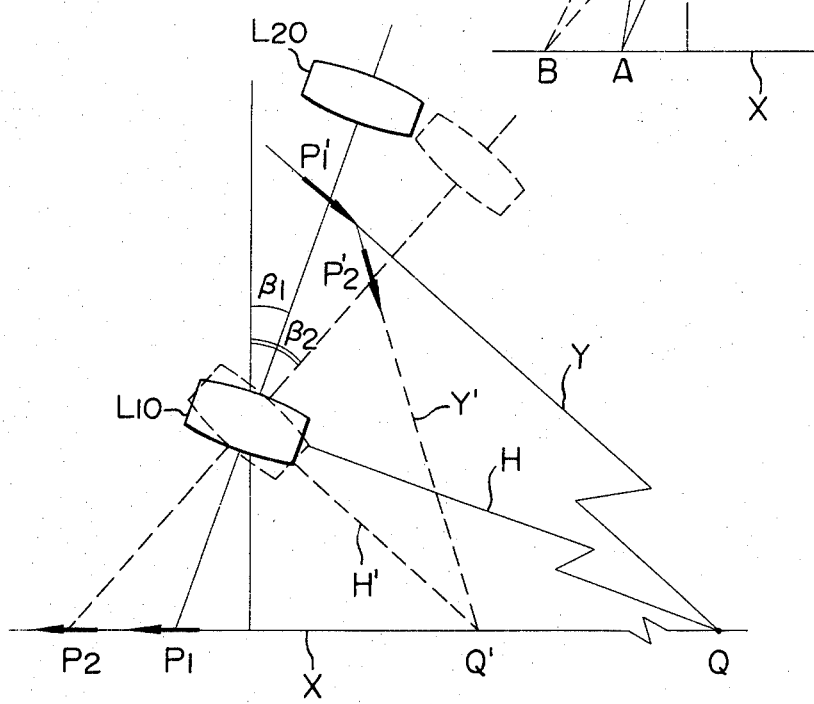
FIG. 3 is a side view showing the manner in which an image is formed in the prior art device by the tilt of the observation optic axis.

In the above-described construction, by rotating the second groups L2, L'2 of the objective lens and the eyepieces L3, L'3 as a unit substantially about the exit pupil of the first group L1 of the objective lens, it is possible continuously to move the field of view. In the side view of FIG. 6, the case where the angle of inclination of the observation optic axis in the stereoscopic microscope of the present invention is $\theta_1$ is depicted by solid lines, and the case where said angle of inclination is $\theta_2$ is depicted by dash lines. Since the two observation optic axes are equivalent in the construction of the present invention, as well, only one of the observation optic axes is shown and described hereinafter.

The light flux from the object point A on the object plane X passes through the first group L1 of the objective lens, whereafter it becomes a parallel flux of an angle $\theta_1$, so that it enters the second group L2 of the objective lens and is focused as an image point A' on the focal plane behind the second group L2. Thus, when the angle of inclination of the observation optic axis is $\theta_1$, the object point A becomes the center of the observation view field of the eyepiece L3. As the angle of inclination of the observation optic axis is varied from $\theta_1$ to $\theta_2$, the center of the view field is moved continuously from point A to point B and when the angle of inclination is $\theta_2$ the image point B' of the object point B is focused on the focal plane behind the second group L2 and becomes the center of the observation view field. Also, since the image plane Y is always coincident with the focal plane behind the second group L2 of the objective lens, the variation in the inclination of the observation optic axis and the variation in the inclination of the image plane Y are always equal, so that the position of the image plane Y relative to the second group L2 of the objective lens and to the eyepiece L3 is not varied at all. Therefore, by varying the angle of inclination with the second group L2 of the objective lens and the eyepiece L3 as a unit, it is possible to select the view field and to ensure the procession of a clear image throughout the entire view field, and to enable a wider range of the object to be stereoscopically observed even at higher magnifications. Such a construction is very simple in that the second group of the objective lens and the eyepiece are provided in a single lens barrel and two of such lens barrels are rotatably disposed about the first group of the objective lens.

In the above-described stereoscopic microscope of the present invention, as the angle formed by the first lens group L1 and the second group L2 of the objective lens is greater, an object more remote from the optic axis of the first group L1 may be observed, but the range that can be observed is limited by the covering angle of view of the first group. Thus, the first group of the objective lens should preferably cover a wide angle of view and yet keep a good aberration balance even if a sufficient quantity of light passes through the marginal portion. Also, when the inclination of the second group relative to the first group is to be varied, it is desirable that the center of rotational movement of the second group be in the vicinity of the center of the exit pupil of the first lens, thus minimizing the reduction in the diameter and quantity of light in the marginal portion.

The first group of the objective lens may of course be cemented lenses in order sufficiently to correct the chromatic aberration and may comprise a combination of several lenses sufficiently to correct various other aberrations. It is also readily possible to effect continuous magnification change by endowing the second groups of the objective lens with a magnification changing function like a zoom lens.

I believe that the construction and operation of my novel stereoscopic microscope will now be understood and that the advantages thereof will be fully appreciated by those persons skilled in the art.

I claim:

1. A microscope for stereoscopically observing therethrough an object from an oblique direction, comprising:

a first convergent lens group disposed with the optic axis thereof perpendicular to the object plane to collimate the light from each point on the object plane when the focal plane thereof is coincident with the object plane; and two second convergent lens groups having equivalent optical performances and parallel-disposed so that the principal planes thereof are coincident with each other on the exit side of said first convergent lens group and that the principal planes thereof form a predetermined angle with the principal plane of said first lens group, said predetermined angle substantially defining the oblique direction of observation.

2. A microscope as defined in claim 1, further comprising two eyepieces disposed so that the optic axes thereof are coincident, respectively, with the optic axes of said two second convergent lens groups on the exit side thereof and that the entrance side focal points thereof are coincident with the focal points on the exit side of said two second convergent lens groups.

3. A microscope as defined in claim 2, wherein said two second convergent lens groups and said two eyepieces are movable as a unit to vary their angular position relative to said first convergent lens group.

4. A microscope as defined in claim 3, wherein the movement of said two second convergent lens groups and said two eyepieces is rotational movement substantially about the exit pupil of said first convergent lens group.

* * * * *